United States Patent
Greenhalgh

(10) Patent No.: US 8,631,172 B2
(45) Date of Patent: Jan. 14, 2014

(54) ROUTER AND METHOD OF ROUTING WITH REDUNDANCY

(75) Inventor: Stephen Greenhalgh, Berkshire (GB)

(73) Assignee: Snell Limited, Reading, Berkshire (GB)

( * ) Notice: Subject to any disclaimer, the term of this patent is extended or adjusted under 35 U.S.C. 154(b) by 853 days.

(21) Appl. No.: 12/756,705

(22) Filed: Apr. 8, 2010

(65) Prior Publication Data

US 2010/0260175 A1    Oct. 14, 2010

(30) Foreign Application Priority Data

Apr. 9, 2009  (GB) .................................. 0906212.6

(51) Int. Cl.
  *G06F 3/06*  (2006.01)
  *H04J 3/16*  (2006.01)
(52) U.S. Cl.
  USPC .......................................... 710/38; 709/226
(58) Field of Classification Search
  USPC ........................................................ 710/38
  See application file for complete search history.

(56) References Cited

U.S. PATENT DOCUMENTS

| | | | |
|---|---|---|---|
| 5,072,217 A * | 12/1991 | Georgiou et al. ............ | 340/2.25 |
| 6,946,948 B2 * | 9/2005 | McCormack et al. ....... | 340/2.28 |
| 7,065,037 B1 * | 6/2006 | Viswanathan et al. ........ | 370/217 |
| 7,710,153 B1 * | 5/2010 | Masleid et al. ................ | 326/82 |
| 2002/0136484 A1 | 9/2002 | MacDonald | |
| 2002/0156940 A1 * | 10/2002 | Meyer et al. ...................... | 710/1 |
| 2005/0135355 A1 | 6/2005 | Muthukrishnan et al. | |
| 2005/0185654 A1 | 8/2005 | Zadikian et al. | |

FOREIGN PATENT DOCUMENTS

| | | |
|---|---|---|
| EP | 0170799 A1 | 2/1986 |
| WO | 2005027391 | 3/2005 |

OTHER PUBLICATIONS

GB0906212.6 Search Report dated Jul. 27, 2009, 1 page.

* cited by examiner

*Primary Examiner* — Henry Tsai
*Assistant Examiner* — Titus Wong
(74) *Attorney, Agent, or Firm* — Michael Best & Friedrich LLP

(57) ABSTRACT

A method of routing audio or video data. A plurality of source data inputs to input modules are divided into groups and main crosspoint modules receive one group from every input module, and destination data outputs from output modules are divided into groups and each output module receives one group from every main crosspoint module. Input modules send a duplicate of one selected group to a redundant crosspoint module and output modules receive a group from a redundant crosspoint module and can use that group in place of any group from a main crosspoint module.

11 Claims, 1 Drawing Sheet

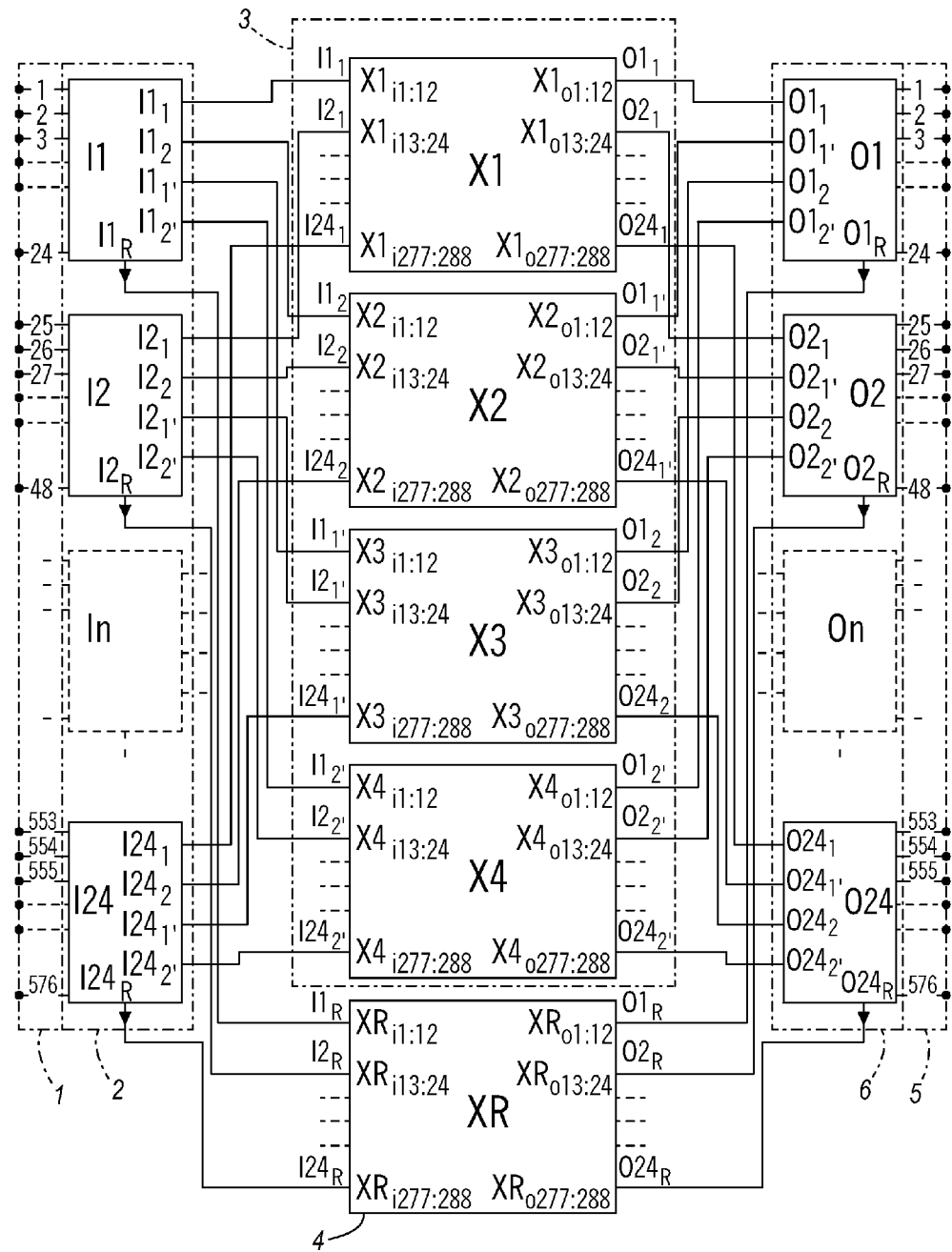

ROUTER AND METHOD OF ROUTING WITH REDUNDANCY

RELATED APPLICATION

The present application claims the benefit of prior filed Great Britain Patent Application No. GB09006212.6, filed Apr. 9, 2009, the entire contents of which are hereby incorporated by reference.

FIELD OF THE INVENTION

This invention concerns routing or switching systems that are tolerant of hardware failures. It would typically be used to route or switch high-speed digital data, such as uncompressed, high-definition television.

BACKGROUND

Systems that enable any one of a number of signal sources to be routed to any one of a number of signal destinations are well known. The signals may be analog audio, analog video or digital data; in the remainder of this specification the term 'data' will be used to include all of these signal types. In the broadcast industry such systems are known as 'routers' or 'switching matrices' and large systems may have hundreds of sources and or destinations. The failure of a router usually has severe consequences for the operability of a broadcast facility, and it is therefore common for so-called 'redundant' distribution topologies to be used in which alternative data paths can be substituted for paths blocked by hardware failures.

A typical broadcast router comprises: a number of input modules that adapt incoming signals to a convenient format for switching and distribution within the router; a number of 'crosspoint' modules that select particular signals for onward distribution to specific destinations; and, a number of output modules that adapt the internal signal format to the format required at the output of the router. Generally all the modules comprise plug-in printed-circuit assemblies that can be removed or replaced by the user. Known methods for providing redundancy against the failure of a crosspoint include the provision of one or more additional crosspoint modules. In one such system an additional, redundant crosspoint module has its inputs paralleled with those of an existing crosspoint module and its outputs are connected to secondary inputs of the output modules fed by the existing crosspoint module. The output modules are provided with two-way switches at their inputs so that the signal from the 'redundant' crosspoint can be selected if the normal crosspoint module should fail.

The very high data rates associated with high-definition television require impedance-matched transmission lines to be used for the interconnection of the components of a router and this can complicate the provision of additional connections to redundant crosspoints.

SUMMARY

The invention consists in one aspect in a method of routing and a router that distributes a plurality of sources of analog or digital audio or video data to a plurality of destinations in which:
input modules receive source data at a plurality of source data inputs and send corresponding input signals to crosspoint modules,
output modules supply destination data to a plurality of data destinations from a plurality of destination data outputs and receive corresponding output signals from crosspoint modules,
main crosspoint modules, and a redundant crosspoint module, control the routing of outputs from the said input modules to inputs of the said output modules,
wherein:
source data inputs to input modules are divided into groups and each main crosspoint module receives one group of corresponding input signals from every input module, and,
input modules send a duplicate of one selected group of corresponding input signals to a redundant crosspoint module.
In a preferred embodiment:
destination data outputs from output modules are divided into groups and each output module receives one group of corresponding output signals from every main crosspoint module,
and,
output modules receive a group of corresponding output signals from a redundant crosspoint module and can use that group in place of any group of corresponding output signals from a main crosspoint module to derive destination data at a destination data output.

The number of source data input groups may be equal to the number of destination data output groups.

In a preferred embodiment there are two source data input groups and two destination data output groups.

In one embodiment, the invention provides a method of routing that distributes a plurality of sources of at least one of analog audio, digital audio, and video data to a plurality of destinations. The method includes the acts of dividing a plurality of source data inputs of a plurality of input modules into a plurality of groups, receiving source data at the plurality of source data inputs, sending, from each of the plurality of input modules, input signals corresponding to the source data received at each of the plurality of groups of source data inputs to at least one of a plurality of main crosspoint modules, sending, from each of the plurality of input modules, input signals corresponding to the source data received at one of the plurality of groups of source data inputs to a redundant crosspoint module, receiving, at a plurality of output modules, output signals from the plurality of main crosspoint modules and the redundant crosspoint module, supplying, via the plurality of output modules at a plurality of destination data outputs, destination data corresponding to the output signals from the plurality of main crosspoint modules, and controlling, at the plurality of main crosspoint modules and the redundant crosspoint module, the routing of the input signals from the plurality of input modules to the output modules.

In another embodiment the invention provides a method of a method of routing that distributes a plurality of sources of at least one of analog audio, digital audio, and video data to a plurality of destinations. The method including the acts of receiving source data at a plurality of source data inputs of a plurality of input modules, sending, from each of the plurality of input modules, input signals corresponding to the received source data to a plurality of main crosspoint modules, sending, from each of the plurality of input modules, input signals corresponding to the received source data to a redundant crosspoint module, controlling, at the plurality of main crosspoint modules and the redundant crosspoint module, the routing of the input signals from the plurality of input modules to a plurality of output modules, receiving, at the plurality of output modules, output signals from the plurality of main crosspoint modules and the redundant crosspoint module, dividing a plurality of destination data outputs of the plurality of output modules into a plurality of groups, generating, at the plurality of groups of the plurality of destination data outputs, destination data corresponding to a plurality of groups of output signals from the plurality of main crosspoint modules, and generating destination data, at one of the plurality of groups of destination data outputs, destination data corresponding to a plurality of output signals received from the redundant crosspoint module.

In another embodiment the invention provides a router configured to distribute a plurality of sources of at least one of analog audio, digital audio, and video data to a plurality of destinations. The router includes a plurality of input modules configured to receive source data at a plurality of source data inputs and to generate a plurality of groups of input signals corresponding to the received source data, a plurality of main crosspoint modules receiving the plurality of groups of input signals, a redundant crosspoint module receiving one of the plurality of groups of input signals, and a plurality of output modules that receive a plurality of output signals from the main crosspoint module and the redundant crosspoint module, and generates destination data corresponding to the received output signals at a plurality of destination data outputs.

The plurality of main crosspoint modules and the redundant crosspoint module control the routing of the plurality of input signals from the input modules to the plurality of output modules. The plurality of destination outputs are divided into a plurality of groups and the plurality of output modules use the plurality of output signals from the redundant crosspoint module to generate the destination data for one of the plurality of groups of destination outputs.

In another embodiment the invention provides a router configured to distribute a plurality of sources of at least one of analog audio, digital audio, and video data to a plurality of destinations. The router includes a plurality of input modules that receive source data at a plurality of source data inputs and send corresponding input signals to crosspoint modules, a plurality of output modules that receive output signals and generate corresponding destination data at a plurality of destination data outputs, and a plurality of main crosspoint modules, and a redundant crosspoint module, that generate the output signals, controlling the routing of outputs from the said input modules to inputs of the said output modules. The plurality of source data inputs of each of the plurality of input modules are divided into groups and each main crosspoint module receives one of the plurality of groups of corresponding input signals from every input module. The plurality of input modules send a duplicate of one of the plurality of groups of corresponding input signals to the redundant crosspoint module.

Other aspects of the invention will become apparent by consideration of the detailed description and accompanying drawings.

BRIEF DESCRIPTION OF THE DRAWINGS

FIG. 1, shows a block diagram of an exemplary embodiment of a router.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A preferred embodiment of the invention that provides a router with 576 sources and 576 destinations will now be described. As will be explained later, other embodiments and other numbers of sources and/or destinations are possible and fall within the appended claims. The control system will not be described, as the skilled person will appreciate how known router control methods can be applied to the novel system described herein.

Referring to FIG. 1, the 576 inputs (1) are received by 24 input modules (2), which will be individually designated I1 to I24. Each input module receives 24 of the 576 inputs: the module I1 receives inputs 1 to 24; the module I2 receives inputs 25 to 48; and so on, so that module I24 receives inputs 553 to 576. Each input module converts its inputs into a suitable format for internal distribution, for example a balanced differential signal having controlled differential-mode and common-mode source impedances.

The converted outputs from the 24 input modules (2) are fed to 4 main crosspoint modules (3), which will be individually designated X1 to X4; and, a 'redundant' crosspoint module (4) which will be designated XR. As will be explained below, the redundant crosspoint (4) can be arranged to 'take over from' any one the crosspoint modules (3) that fails to operate correctly.

The 576 outputs (5) are driven from 24 output modules (6), which will be individually designated O1 to O24. Each output module drives 24 of the 576 outputs (5); the module O1 drives outputs 1 to 24; the module O2 drives outputs 25 to 48; and so on, so that module O24 drives outputs 553 to 576. The output modules receive inputs from the crosspoint modules (3) and (4) and convert them to the required output format.

The required number of main crosspoint modules (3) will depend on the overall size of the router and design choices for the numbers of inputs and outputs of the crosspoint modules. In the current example each crosspoint module has 288 inputs and 288 outputs and each crosspoint module can route any of its inputs to any number of its outputs. The four main crosspoint modules (3) thus have a total of 1,152 inputs and the same total number of outputs. In order to allow any of the inputs (1) to be connected to any of the outputs (5) via a main crosspoint, the inputs to the main crosspoints must each be connected to respective outputs from the input modules (2) and the outputs from the main crosspoints must each be connected to respective inputs of the output modules (6). As there are twice as many main crosspoint inputs as inputs (1), each of the inputs (1) is converted (by its respective input module) into two identical input module outputs. And, as there are twice as many main crosspoint outputs as outputs (5), each of the outputs (5) is derived (by its respective output module) from a choice between two possible main crosspoint module outputs.

As mentioned above, it is required that the redundant crosspoint (4) should be able to 'replace' any of the main crosspoints (3). This means that it must have access to all the outputs from the input modules (2) (excluding the duplicated copies) and all the inputs to the output modules (6) (excluding the 'second choice' inputs). This implies that the redundant crosspoint module requires 576 inputs and 576 outputs. However, it is highly desirable that the redundant crosspoint module should be exactly the same as the other, main crosspoint modules, so as to minimize the number of different types of module and to simplify the design of the interconnections between modules. This is apparently not possible because the redundant crosspoint module requires more input and output connections (576 inputs and 576 outputs) than the main crosspoint modules (288 inputs and 288 outputs).

The inventor has appreciated that this difficulty may be overcome by dividing the inputs processed by each input module, and the outputs provided by each output module, into respective pluralities of groups, so that the redundant crosspoint module receives one group of signals from each input module and supplies one group of signals to each output module. As the groups comprise respective sub-sets of the input and output signals, the numbers of connections to the redundant crosspoint are reduced. By suitable choice of the number of groups, the numbers of connections to the redundant crosspoint module can be made equal to the numbers of connections to each of the main crosspoint modules, thus enabling identical modules to be used.

In the example shown in FIG. 1 there are two input groups and two output groups. Input module I1 converts of half of its inputs (all the odd numbered inputs, say) to the router's internal distribution format and outputs them to crosspoint module X1; these twelve signals comprise the first group of signals from I1. Copies of these twelve signals are also input to crosspoint module X3. In FIG. 1 the first group of twelve output signal are designated I11 and the corresponding duplicated group of twelve output signals are designated $I1_{1'}$.

The other half of the inputs to I1 (all the even numbered inputs, say) are converted and input to crosspoint module X2; these twelve signals comprise the second group of signals from I1. Copies of these twelve signals are also input to crosspoint module X4. In FIG. 1 these two groups of twelve output signals are designated $I1_2$ and $I1_{2'}$ respectively.

There is thus a connection from I1 to every one of the main crosspoint modules (3). And, all the inputs to I1 have been converted to the internal format and input to main crosspoint modules. The remaining input modules I2 to I24 each provide two converted versions of each their inputs to the main crosspoint modules (3) in an analogous way. Each of the main crosspoint modules (3) thus receives a group of twelve signals from each of the 24 input modules (2), making 288 inputs to each main crosspoint module.

The output module O1 receives a group of twelve signals from each of the main crosspoint modules (3). A first group of its respective outputs (5) (all the odd numbered outputs, say) is formed by choosing between corresponding signals from X1 and X2. For example, the first output is formed by taking either the first signal in the group of twelve signals from X1 or the first signal in the group of twelve signals from X2 and converting it into the required output format. In FIG. 1 the first group of twelve signals from X1 is designated O11, and the first group of twelve signals from X2 is designated $O1_{1'}$.

A second group of output signals from O1 (all the even numbered outputs, say) is formed in a similar way from choices between respective corresponding signals in a group of twelve signals from X3 and a group of twelve signals from X4. In FIG. 1 the second group of twelve signals from X3 is designated O12, and the second group of twelve signals from X4 is designated $O1_{2'}$.

The remaining output modules O2 to O24 are connected to the main crosspoint modules (3) in a similar way so that every one of the output modules (6) receives a group of twelve signals from every one of the main crosspoint modules (3). Thus all 288 outputs from each main crosspoint module are connected to an output module.

The connections described above enable any of the inputs (1) to be routed to any of the outputs (5) by suitable control of the main crosspoint modules (3) and the switches in the output modules (6). However, should one of the main crosspoint modules (3) fail, one group of inputs (1) to one of the input modules (2) will become unavailable to one group of outputs (5) from one of the output modules (6).

The redundant crosspoint (4) is able to replace this missing connectivity as will now be described. Each of the input modules (2) is provided with an additional group of twelve converted output signals that can provide an additional copy of one of the two different groups of output signals. The choice of group is provided by data switches within the input modules. The redundant crosspoint (4) receives each of these groups of twelve signals from each of the 24 input modules, making 288 input signals.

Each of the output modules (6) is provided with an additional group of twelve signal inputs that can be chosen to replace one of the groups of twelve signals from the main crosspoints (3). These 24 groups of twelve signals are supplied by the 288 outputs of the redundant crosspoint (4). Thus connections blocked by a failed main crosspoint module can be made via the redundant crosspoint module by suitable control of: the switches in the input modules (2); the connections in the redundant crosspoint module (4); and, the choice of input group by output modules (6).

The invention can be applied to routers other than that shown in FIG. 1. Other numbers of inputs and outputs can be used. The number of inputs to the router can be different from the number of outputs from the router. Crosspoint modules may have differing numbers of inputs and outputs. The number of input groups can be different from the number of output groups. In some configurations the duplication of signals in the input modules, or the selection of different main crosspoints by the output modules need not be used; however, in these cases, a main crosspoint failure that affects more than one group of signals simultaneously cannot be overcome by the redundant crosspoint.

Although the signal format at the input and output of the router is usually different from that used internally, this need not be the case; signal format conversion can occur at any point in the router, or the same format may be used throughout. The signal chains through the router may be designed to accommodate more than one signal format so that, for example, high-definition and standard-definition television could be carried simultaneously on separate routes through the same router.

Various features and advantages of the invention are set forth in the following claims.

What is claimed is:

1. A method of routing that distributes a plurality of sources of at least one of analogue audio, digital audio, and video data to a plurality of destinations, the method comprising:
   dividing source data inputs of a plurality of input modules into a plurality of groups of source data inputs;
   receiving source data at the source data inputs;
   sending, from each of the plurality of input modules, input signals corresponding to the source data received at each of the plurality of groups of source data inputs to at least one of a plurality of main crosspoint modules with every main crosspoint module receiving one group of corresponding input signals from every input module and receiving only corresponding input signals in that group;
   sending, from each of the plurality of input modules, input signals corresponding to the source data received at a selected one of the plurality of groups of source data inputs to a redundant crosspoint module;
   receiving, at a plurality of output modules, output signals from the plurality of main crosspoint modules and output signals from the redundant crosspoint module;

supplying, via the plurality of output modules at a plurality of destination data outputs, destination data corresponding to the output signals from the plurality of main crosspoint modules: and controlling, at the plurality of main crosspoint modules and the redundant crosspoint module, routing of the input signals corresponding to the source data received at each of the plurality of groups of source data inputs from the plurality of input modules to the output modules.

2. A method according to claim 1, further comprising dividing the plurality of output signals from the plurality of main crosspoint modules and the output signals from the redundant crosspoint module into a second plurality of groups;

receiving, at each of the plurality of output modules, one of the second plurality of groups of output signals from each of the plurality of main crosspoint modules;

receiving, at each of the plurality of output modules, one of the second plurality of groups of output signals from the redundant crosspoint module; and replacing, at the plurality of destination data outputs, destination data corresponding to the output signals from one of the plurality of main crosspoint modules, with destination data corresponding to the output signals from the redundant crosspoint module.

3. A method according to claim 2 where the number of the plurality of groups of source data inputs is equal to the number of the second plurality of groups.

4. A method according to claim 2 where the quantity of the plurality of groups of source data inputs is two and the quantity of the second plurality of groups is two.

5. A method of routing that distributes a plurality of sources of at least one of analogue audio, digital audio, and video data to a plurality of destinations, the method comprising:

receiving source data at source data inputs of a plurality of input modules;

sending to a plurality of main crosspoint modules, from each of the plurality of input modules, input signals corresponding to the received source data;

sending, from each of the plurality of input modules, input signals corresponding to the received source data to a redundant crosspoint module;

controlling, at the plurality of main crosspoint modules and the redundant crosspoint module, routing of the input signals corresponding to the received source data from the plurality of input modules to a plurality of output modules;

receiving, at the plurality of output modules, output signals from the plurality of main crosspoint modules and the redundant crosspoint module;

dividing destination data outputs of the plurality of output modules into a plurality of groups of destination data outputs;

generating, at the plurality of groups of destination data outputs, destination data corresponding to a plurality of groups of output signals from the plurality of main crosspoint modules; and generating destination data, at one of the plurality of groups of destination data outputs, the destination data corresponding to a plurality of output signals received from the redundant crosspoint module.

6. A router configured to distribute a plurality of sources of at least one of analogue audio, digital audio, and video data to a plurality of destinations, the router comprising:

a plurality of input modules configured to receive source data at a plurality of source data inputs and to generate a plurality of groups of input signals corresponding to the received source data;

a plurality of main crosspoint modules receiving the plurality of groups of input signals;

a redundant crosspoint module receiving one of the plurality of groups of input signals; and a plurality of output modules that 1) receives a output signals from the main crosspoint module and output signals from the redundant crosspoint module, and 2) generates destination data corresponding to the received output signals at a plurality of destination data outputs;

wherein the plurality of main crosspoint modules and the redundant crosspoint module control routing of the plurality of input signals corresponding to the received source data from the input modules to the plurality of output modules; and wherein the plurality of destination data outputs are divided into a plurality of groups and the plurality of output modules use the plurality of output signals from the redundant crosspoint module to generate the destination data for one of the plurality of groups of destination outputs.

7. A router configured to distribute a plurality of sources of at least one of analogue audio, digital audio, and video data to a plurality of destinations, the router comprising:

a plurality of input modules that receive source data at source data inputs and send corresponding input signals to crosspoint modules;

a plurality of output modules that receive output signals and generate corresponding destination data at a destination data outputs; and a plurality of main crosspoint modules and a redundant crosspoint module that 1) generate the output signals, and 2) control routing of signals from the said input modules to said output modules;

wherein:

the source data inputs of the plurality of input modules are divided into groups and each main crosspoint module receives one of the plurality of groups of corresponding input signals from every input module and receives only corresponding input signals in that group, and the plurality of input modules send a duplicate of one the plurality of groups of corresponding input signals to a redundant crosspoint module.

8. The router according to claim 7, wherein destination data outputs of the plurality of output modules are divided into groups, each of the plurality of output modules receiving one of a plurality of groups of output signals from each of the plurality of main crosspoint modules and the plurality of output modules receive one of the plurality of groups of output signals from the redundant crosspoint module, the plurality of output modules using one or more of the plurality of groups of outputs signals from the redundant crosspoint module in place of one or more of the plurality of groups of output signals from one or more of the plurality of main crosspoint modules to derive destination data at the plurality of destination data outputs.

9. The router according to claim 8, where the number of the plurality of groups of the source data inputs is equal to the number of the plurality of groups of destination data outputs.

10. The router according to claim 9, where the plurality of groups of the source data inputs includes two source data input groups and the plurality of groups of destination data outputs includes two destination data output groups.

11. The router according to claim 8, where the redundant crosspoint module is interchangeable with any one of the main crosspoint modules.

* * * * *